US008065566B2

(12) United States Patent
Yamamoto et al.

(10) Patent No.: US 8,065,566 B2
(45) Date of Patent: Nov. 22, 2011

(54) NODE DEVICE, CONTROL DEVICE, CONTROL METHOD AND CONTROL PROGRAM

(75) Inventors: Takashi Yamamoto, Kawasaki (JP); Takaharu Ishizuka, Kawasaki (JP); Toshikazu Ueki, Kawasaki (JP); Makoto Hataida, Kawasaki (JP); Yuka Hosokawa, Kawasaki (JP); Takeshi Owaki, Kawasaki (JP); Daisuke Itou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1227 days.

(21) Appl. No.: 11/785,759

(22) Filed: Apr. 19, 2007

(65) Prior Publication Data

US 2008/0046792 A1    Feb. 21, 2008

(30) Foreign Application Priority Data

Aug. 18, 2006   (JP) ................................. 2006-223346

(51) Int. Cl.
     *G06F 11/10*    (2006.01)
(52) U.S. Cl. ............................................ 714/43; 714/57
(58) Field of Classification Search .................... 714/43, 714/57, 746
     See application file for complete search history.

(56) References Cited

U.S. PATENT DOCUMENTS

| 4,665,520 | A | * | 5/1987 | Strom et al. ...................... 714/15 |
| 4,991,174 | A | * | 2/1991 | Mori et al. ....................... 714/10 |
| 5,047,917 | A | * | 9/1991 | Athas et al. .................... 719/314 |
| 5,132,967 | A | * | 7/1992 | Kalajainen ..................... 370/462 |
| 5,436,624 | A | * | 7/1995 | Pearce et al. .................... 340/3.9 |
| 5,742,753 | A | * | 4/1998 | Nordsieck et al. .............. 714/11 |
| 5,761,413 | A | * | 6/1998 | Frank et al. ..................... 714/49 |
| 6,519,736 | B1 | * | 2/2003 | Chen et al. ..................... 714/768 |
| 7,047,475 | B2 | | 5/2006 | Sharma et al. ................ 714/758 |
| 7,346,825 | B2 | * | 3/2008 | Rankin et al. ................. 714/752 |
| 2003/0046628 | A1 | | 3/2003 | Rankin et al. ................. 714/752 |
| 2004/0153952 | A1 | | 8/2004 | Sharma et al. ................ 714/781 |
| 2005/0138487 | A1 | | 6/2005 | Vaid et al. ....................... 714/52 |

FOREIGN PATENT DOCUMENTS

| GB | 2412984 | 10/2005 |
| JP | 2004-242294 | 8/2004 |

OTHER PUBLICATIONS

Du, X. et al., *Preventing Network Instability Caused by Propagation of Control Plane Poison Messages*, IEEE Military Communications Conference, New York, NY, vol. 1, pp. 93-98, Oct. 7, 2002 (6 pages).
Extended European Search Report dated Jan. 24, 2008 in corresponding European Patent Application No. 07106700.3 (6 pages).
Notice Requesting Submission of Opinion dated Sep. 18, 2008 in corresponding Korean Application No. 10-2007-0047935 (4 pp).

* cited by examiner

*Primary Examiner* — Stephen Baker
(74) *Attorney, Agent, or Firm* — Fujitsu Patent Center

(57) ABSTRACT

A control device managing a plurality of nodes transmitting and receiving data containing an error correcting code, comprises means accepting, when any one of the nodes detects an uncorrectable error from the data containing the error correcting code, a signal transmitted by the node detecting the error, means judging from a record of the detection of a first node, when accepting the signal from a second node receiving data transmitted by the first node, whether or not the first node has detected the uncorrectable error from the data transmitted to the second node, and means stopping, when the first node has detected the uncorrectable error from the data transmitted to the second node, a process attributed to the acceptance of the signal from the second node.

9 Claims, 5 Drawing Sheets

NODE DEVICE, CONTROL DEVICE, CONTROL METHOD AND CONTROL PROGRAM

BACKGROUND OF THE INVENTION

The present invention relates to a control device managing a plurality of nodes and to a node device cooperating with the control device.

In a system capable of recognizing poisoning data attached to uncorrectable data, when an existing node receives the poisoning data, a data packet containing the poisoning data is sent to an existing node situated at a posterior stage. Therefore, a fault detection rate is improved without detecting unnecessary uncorrectable errors. The uncorrectable data is defined as the data that can not be corrected. Further, the uncorrectable error is defined as the data error that can not be corrected. "Poisoning" connotes that when the node receives the uncorrectable data, respective bits of an ECC (Error Correcting Code) attached to a tailing part of the data are converted into a specified pattern (data). Namely, the poisoning comes under one category of the term "uncorrectable".

Data processing can be executed at the existing node at the final stage by flowing the data packet through to the end of the system. In FIG. 1, the uncorrectable error occurs in a bus 1 between an existing node A and an existing node B (which is represented by Occurrence of UE in FIG. 1). In this case, the existing node B receiving the uncorrectable data from the existing node A detects the uncorrectable error (which is represented by Detection of UE in FIG. 1). Then, the existing node B executes a poisoning process about the ECC attached to the uncorrectable data, and transmits the data packet containing the poisoning data to an existing node C.

The existing node C can recognize the poisoning data attached to the uncorrectable data and therefore, even when receiving the data packet containing the poisoning data, detects none of the uncorrectable error. Then, the existing node transmits the data packet containing the poisoning data to an existing node D. Thus, the detection of the uncorrectable error is made by only the existing node B but gets unnecessary in the existing node C and in the existing node D, thereby improving the fault detection rate.

There has hitherto been a poisoning data recognizing method in a case based on such a premise of the system that all of the nodes are capable of recognizing the poisoning data attached to the uncorrectable data.

[Patent document 1] Japanese Patent Application Laid-Open Publication No. 2004-242294

SUMMARY OF THE INVENTION

In the system capable of recognizing the poisoning data attached to the uncorrectable data, when recognizing the poisoning data midway on a route within the system, the detection of the uncorrectable error is not conducted. In the case of adding to the system a general-purpose node incapable of recognizing the poisoning data attached to the uncorrectable data, however, when the poisoning data passes through the general-purpose node, the uncorrectable error is detected.

Normally, if the uncorrectable error is detected by the general-purpose node, this is pointed as a fault in the general-purpose node or a fault in the bus connected to the general-purpose node. Even if the poisoning data is attached to the uncorrectable data passing though the general-purpose node, the general-purpose node detects the uncorrectable error. Namely, the uncorrectable error detected by the general-purpose node does not undergo judgment as to whether the poisoning data is attached to the uncorrectable data or not.

Accordingly, even when the general-purpose node detects the uncorrectable error, it is impossible to distinguish whether or not the poisoning data is attached to the uncorrectable data passing through the general-purpose node.

Hence, it is unfeasible to judge whether it is the fault in the general-purpose node or the fault in the bus connected to the general-purpose node or a fault in a component other than the general-purpose node. As a result, if the uncorrectable data attached with the poisoning data passes through the general-purpose node, the general-purpose node is excessively pointed out as an under-suspicion component, resulting in a problem of causing a necessity for an extra exchange of the component.

It is an object of the present invention to provide a technology for distinguishing whether or not, when the general-purpose node detects the uncorrectable error, the poisoning data is attached to the uncorrectable data passing through the general-purpose node.

The present invention adopts the following means in order to solve the problems. Namely, according to the present invention, a control device managing a plurality of nodes transmitting and receiving data containing an error correcting code, comprises means accepting, when any one of the nodes detects an uncorrectable error from the data containing the error correcting code, a signal transmitted by the node detecting the error, means judging from a record of the detection of a first node, when accepting the signal from a second node receiving data transmitted by the first node, whether or not the first node has detected the uncorrectable error from the data transmitted to the second node, and means stopping, when the first node has detected the uncorrectable error from the data transmitted to the second node, a process attributed to the acceptance of the signal from the second node. With this configuration, when judging from the record of the detection of the first node that the uncorrectable error is detected from the data transmitted by the first node, the signal accepted from the second node can be recognized as being attributed to the first node's transmitting the data containing the uncorrectable error to the second node. As a result, the uncorrectable error contained in the data transmitted and received between the first node and the second node can be recognized to be none of the uncorrectable error occurred due to the second node by stopping the process attributed to the acceptance of the signal from the second node.

Further, the control device according to the present invention may further comprise means controlling a display device that displays detection of the uncorrectable error detected by any one of the nodes, wherein the process attributed to the signal acceptance may be a process of displaying, when accepting the signal from the second node, the detection of the uncorrectable error detected by the second node on the display device. With this configuration, it is possible to disable the display device to display the detection of the uncorrectable error of the second node due to the first node's transmitting the data containing the uncorrectable error to the second node.

Still further, according to the present invention, a node device cooperating with a control device managing a plurality of nodes including a self-node, comprises means transmitting and receiving data containing an error correcting code to and from another node, means converting, when detecting an uncorrectable error from data transmitted to another node, the error correcting code contained in the data into poisoning data having a value other than values that the error correcting code can take, and record control means recording, when the transmitting/receiving means transmits the data containing the poisoning data to another node, a record of the transmission of the poisoning data in recording means referable from the control device. With this configuration, the control device refers to the record of the transmission of the poisoning data that is recorded in the recoding means, thereby making it possible to recognize that the data containing the poisoning data has been transmitted to another node.

Yet further, the present invention may also be a method by which a computer, other devices, other machines, etc execute the processes described above. Moreover, the present invention may also be a program for making the computer, other devices, other machines, etc actualize the functions described above. Furthermore, the present invention may also be a recording medium recorded with such a program that is readable by the computer etc.

According to the present invention, it is possible to distinguish, when the general-purpose node detects the uncorrectable error, whether or not the poisoning data is attached to the uncorrectable data passing through the general-purpose node.

DETAILED DESCRIPTION OF THE INVENTION

A system according to a best mode (which will hereinafter be termed an embodiment) for carrying out the present invention will hereinafter be described with reference to the drawings. A configuration in the following embodiment is an exemplification, and the present invention is not limited to the configuration in the embodiments.

Figure 1:
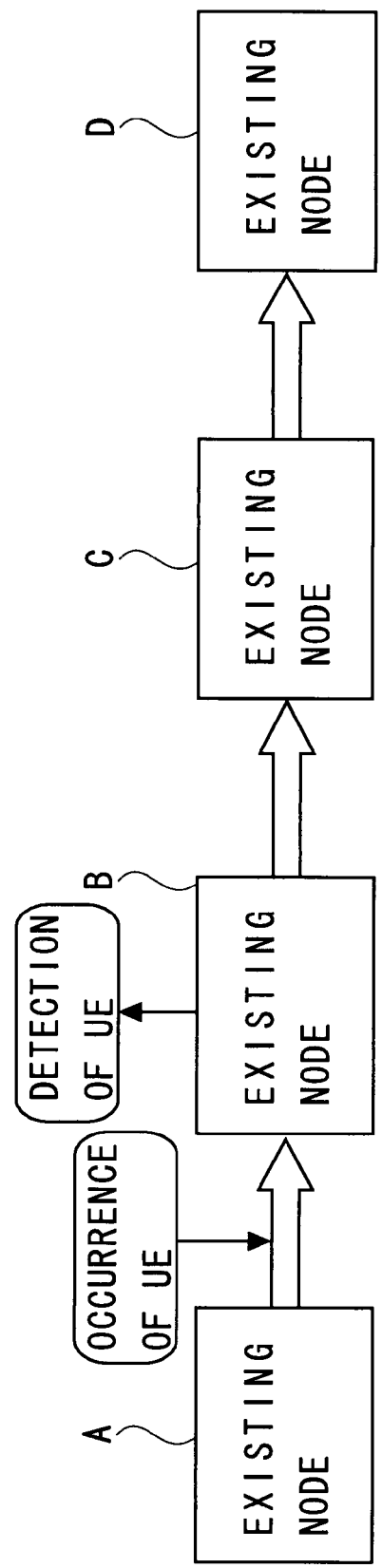
FIG. 1 is an explanatory diagram showing an operation of a conventional uncorrectable error detection system.
Figure 2:
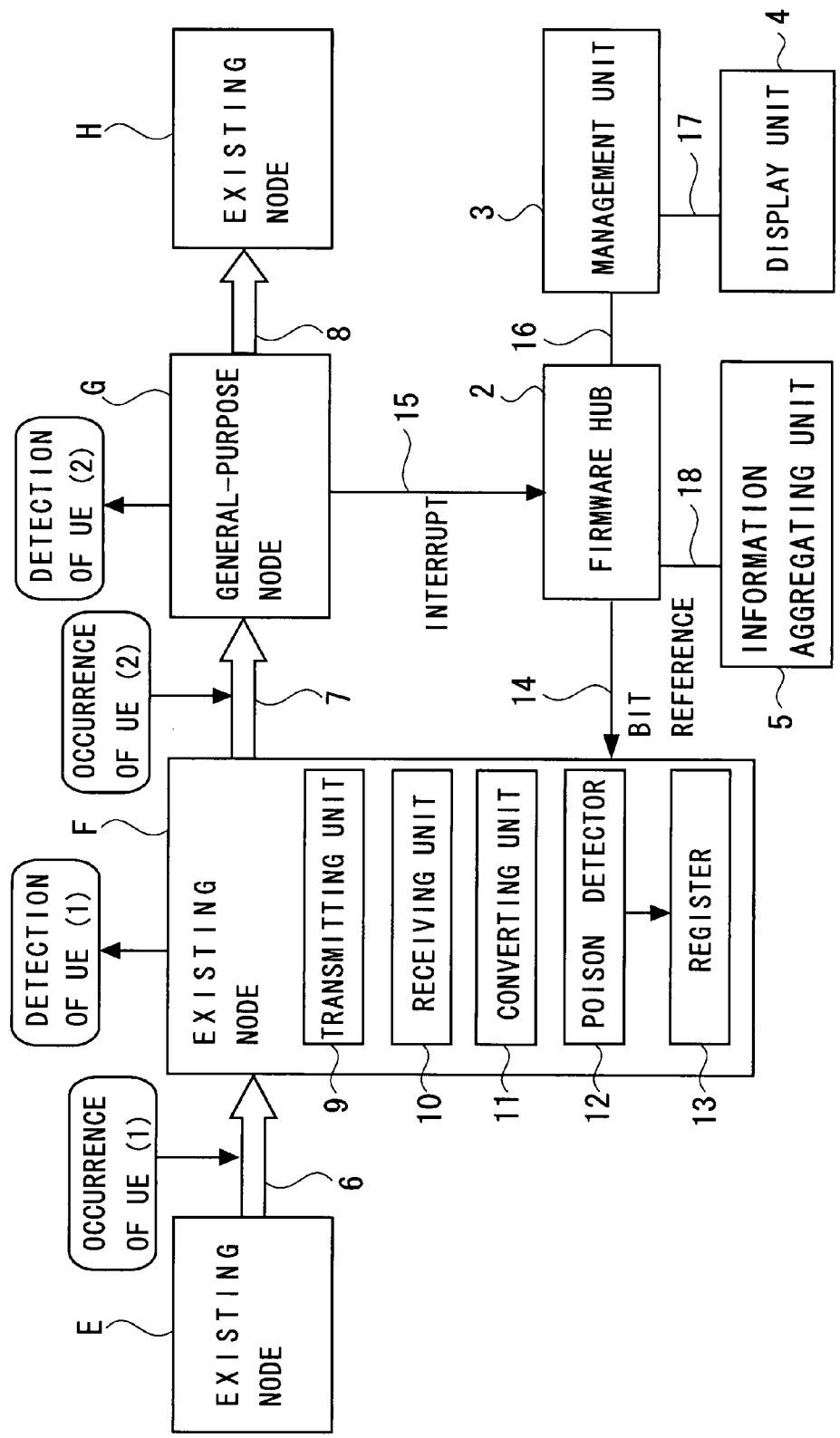
FIG. 2 is an explanatory diagram of the operation of the system in the present embodiment.

FIG. 2 is an explanatory diagram of an operation of the system in the present embodiment. The system in the present embodiment includes existing nodes E, F and H each capable of distinguishing whether data flowing through a self-node is attached with poisoning data or not (capable of recognizing the poisoning data attached to uncorrectable data), and a general-purpose node G incapable of distinguishing whether the data flowing through the self-node is attached with the poisoning data or not (incapable of recognizing the poisoning data attached to the uncorrectable data). An assumption in FIG. 2 is a case of adding the general-purpose node G to the system including the plurality of existing nodes.

The system in the present embodiment further includes a firmware hub 2 that accepts interrupt notification from the general-purpose node G, a management unit 3 that manages the whole system in the present embodiment, a display unit 4 that displays a position where an uncorrectable error is detected, and an information aggregating unit 5 that aggregates all of uncorrectable error occurrence information about the uncorrectable errors occurred in the system in the present embodiment.

The firmware hub 2 internally has a CPU (Central Processing Unit), a RAM (Random Access Memory), etc. Then, the CPU included in the firmware hub 2 executes a variety of processes according to a firmware program stored on the RAM provided in the firmware hub 2. The management unit 3 internally has the CPU, the RAM, etc. Then, the CPU included in the management unit 3 executes a variety of processes according to a program stored on the RAM provided in the management unit 3. The firmware hub 2 and the management unit 3 correspond to a control device according to the present invention.

The information aggregating unit 5 internally has a storage device such as the RAM and a ROM (Read Only Memory). The storage device provided in the information aggregating unit 5 is stored with the uncorrectable error occurrence information.

The display unit 4 includes a display device constructed of, e.g., a CRT (Cathode Ray Tube), a liquid crystal display, a plasma display, etc, and also an output device constructed of a voice output device such as a speaker, a printer device and so on.

The existing node E and the existing node F are connected to each other via a bus 6. The existing node F and the general-purpose node G are connected to each other via a bus 7. The general-purpose node G and the existing node H are connected to each other via a bus 8. Further, each of the existing nodes E, F and H internally has a transmitting unit 9, a receiving unit 10, a converting unit 11, a POISON detector 12 and a register 13. In FIG. 2, illustrations of the transmitting unit 9, the receiving unit 10, the converting unit 11, the POISON detector 12 and the register 13, which are provided in each of the existing nodes E and H, are omitted.

The transmitting unit 9 transmits the date received from another node to still another node. The receiving unit 10 receives the data from another node. The converting unit 11, when receiving the uncorrectable data, converts the ECC attached to the uncorrectable data into the poisoning data. The POISON detector 12 detects whether the transmitting unit 9 transmits the poisoning data or not. The register 13 is recorded with a result of the detection by the POISON detector 12.

The general-purpose node G internally has the unillustrated transmitting unit, receiving unit and detector. The receiving unit of the general-purpose node G receives the data transmitted by the existing node F. The transmitting unit of the general-purpose node G transmits the data to the existing node H. The detector of the general-purpose node G, when the transmitting unit of the general-purpose node G transmits the uncorrectable data or the poisoning data to the existing node H, detects the uncorrectable error. Namely, the detector of the general-purpose node G, when the uncorrectable or the poisoning data passes through the transmitting unit of the general-purpose node G, detects the uncorrectable error.

The existing node F and the firmware hub 2 are connected to each other via a bus 14. Further, the existing node E and the existing node H are each connected to the firmware hub 2 via an unillustrated bus.

Moreover, the general-purpose node G and the firmware hub 2 are connected to each other via a bus 15. The firmware hub 2 is connected via a bus 16 to the management unit 3. The management unit 3 is connected via a bus 17 to the display unit 4. The firmware hub 2 and the information aggregating unit 5 are connected to each other via a bus 18.

Further, the existing node E, the existing node F, the general-purpose node G and the existing node H are each connected via unillustrated buses to the information aggregating unit 5. Therefore, the information aggregating unit 5 aggregates pieces of information about the uncorrectable errors occurred in the existing node E, the existing node F, the general-purpose node G, the existing node H, the bus 6, the bus 7 and the bus 8.

Given next is an explanation of a system operation in the present embodiment in a case where the uncorrectable error occurs. If the uncorrectable error occurs in the bus 6 between the existing node E and the existing node F (which is represented by Occurrence of UE (1) in FIG. 2), the existing node F receives the data, as the uncorrectable data, transmitted by the existing node E. In this case, the existing node F detects the uncorrectable error (Detection of UE (1) in FIG. 2). Then, the existing node F executes a poisoning process about the received uncorrectable data.

The ECC (error correcting code) is attached to the uncorrectable data received from the existing node E. In the case of executing the poisoning process about the uncorrectable data, the existing node F converts the ECC attached to the uncorrectable data into the poisoning data. The poisoning data is unique data recognizable by the existing node E, the existing node F and the existing node F. Further, the poisoning data is converted into a value that is not overlapped with the ECC. Namely, the poisoning data is converted into a value other than values that can be taken by the ECC.

In the present embodiment, after executing the poisoning process about the uncorrectable data, the ECC is not attached to this uncorrectable data. Moreover, in the present embodiment, when the data to be transmitted and received takes 128 bits, the ECC is set to 16 bits. The value of the data and the value of the ECC in the present embodiment are exemplifications, and the data and the ECC according to the present invention are not limited to these values.

The existing node F transmits the poisoning data to the general-purpose node G via the bus 7. When the transmitting unit 9 of the existing node F has transmitted the poisoning data, the POISON detector 12 detects the transmission of the poisoning data. Namely, the POISON detector 12 detects that the poisoning data has passed through the existing node F. Then, the POISON detector 12 sets a bit representing the passage of the poisoning data in the register 13.

Figure 3:
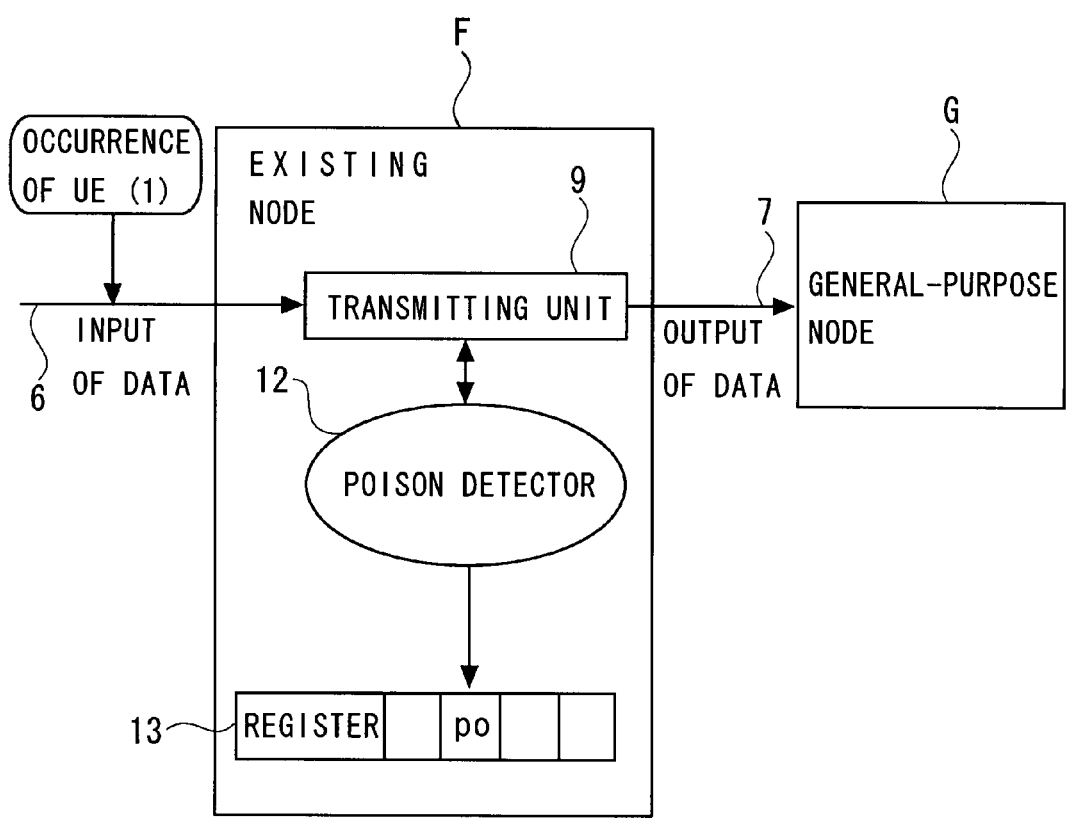
FIG. 3 is an explanatory diagram of an operation of how a POISON detector 12 of an existing node F sets a bit in a register 13.

Herein, an operation of setting the bit in the register 13 by the POISON detector 12 of the existing node F will be explained with reference to FIG. 3. As shown in FIG. 3, when the data is inputted to the existing node F, a poisoning data detecting operation is carried out.

In FIG. 3, when the uncorrectable error occurs on the data input side of the existing node F (which is represented by Occurrence of UE (1) in FIG. 3), the existing node F executes a poisoning process about the inputted uncorrectable data. The POISON detector 12 and the register 13 are provided in positions just anterior to the data output of the existing node F. Therefore, the POISON detector 12 detects that the poisoning data has been transmitted by the transmitting unit 9. Namely, the POISON detector 12 detects that the poisoning data has passed through the transmitting unit 9.

The POISON detector 12 detecting that the poisoning data has passed through the transmitting unit 9, sets "1" in a po bit of the register 13. The po bit of the register 13 is defined as a bit representing the passage of the poisoning data. "0" is set as an initial value in the po bit of the register 13.

Referring back to FIG. 2, the system operation in the present embodiment will be described. As illustrated in FIG. 2, the existing node F, which has executed the poisoning process about the uncorrectable data, transmits the poisoning data to the general-purpose node G. In this case, the existing node F transmits a data packet containing the poisoning data to the general-purpose node G.

The general-purpose node G is incapable of recognizing the poisoning data attached to the uncorrectable data. Hence, the general-purpose node G, when transmitting the poisoning data to the existing node H, detects the uncorrectable error (represented by Detection of UE (2) in FIG. 2). The existing node H is capable of recognizing the poisoning data attached to the uncorrectable data. Therefore, the existing node H, even when receiving the uncorrectable data attached with the poisoning data, does not detect the uncorrectable error.

The general-purpose node G detects the uncorrectable error and gives interrupt notification to the firmware hub 2. The firmware hub 2 receiving the interrupt notification refers to the register 13 of the existing node F.

The firmware hub 2, in the case of referring to the register 13 of the existing node F, queries the information aggregating unit 5 about the uncorrectable error occurrence information. The information aggregating unit 5 aggregates all of the uncorrectable error occurrence information of the uncorrectable errors occurred in the system. To be specific, the information aggregating unit 5 is connected via the buses to all of the nodes existing in the system and is recorded with pieces of position information of all of the nodes existing in the system. Therefore, if the uncorrectable error is detected in any one of the nodes existing in the system, the information aggregating unit 5 gets recorded with the position information of the node in which the uncorrectable is detected.

The firmware hub 2 queries the information aggregating unit 5 about the uncorrectable error occurrence information, thereby acquiring the position information of the existing node F in which the uncorrectable error is detected. Then, the firmware hub 2 acquiring the position information of the existing node F refers to the register 13 of the existing node F.

The firmware hub 2, when confirming that "1" is set in the po bit of the register 13 of the existing node F, notifies the management unit 3 that "1" is set in the po bit of the register 13 of the existing node F. The management unit 3, when receiving from the firmware hub 2 the notification showing that "1" is set in the po bit of the register 13 of the existing node F, controls the display unit 4 not to display the information showing the uncorrectable error detected by the general-purpose node G. Namely, the management unit 3 outputs, via a bus 17, a control signal for displaying none of the position of the general-purpose node G that has detected the uncorrectable error.

The display unit 4 displays the position of the general-purpose node G that has detected the uncorrectable error. The management unit 3 controls the display unit 4, thereby disabling the display unit 4 to display that the general-purpose node G has detected the uncorrectable error due to the general-purpose node G's receiving the poisoning data.

On the other hand, the firmware hub 2, when confirming that "0" is set in the po bit of the register 13 of the existing node F, notifies the management unit 3 that "0" is set in the po bit of the register 13 of the existing node F. The management unit 3, when receiving from the firmware hub 2 the notification saying that "0" is set in the po bit of the register 13 of the existing node F, controls the display unit 4 to display the information showing the uncorrectable error detected by the general-purpose node G. Namely, the management unit 3 outputs, via the bus 17, the control signal for displaying the position of the general-purpose node G that has detected the uncorrectable error.

If the uncorrectable error occurs in the bus 7 via which the existing node F and the general-purpose node G are connected to each other, the uncorrectable data received by the general-purpose node G does not pass through the existing node F. Namely, the uncorrectable data received by the general-purpose node G does not undergo the poisoning process by the existing node F. Therefore, the po bit of the register 13 provided in the existing node F is in a status of the initial value "0".

The present embodiment has exemplified the case where the uncorrectable error occurs in the bus 6 connecting the existing node E and the existing node F to each other, and also exemplified the case the uncorrectable error occurs in the bus 7 connecting the existing node F and the general-purpose node G to each other. The occurrence positions of the uncorrectable errors are just exemplifications, and, for example, there is a case where the uncorrectable error might occur in the existing node F. In this case also, in the same way as in the case where the uncorrectable error occurs in the bus 6 connecting the existing node E and the existing node F to each other, the converting unit 11 of the existing node F executes the poisoning process about the uncorrectable data that is to be transmitted to the general-purpose node G. As a result, the poisoning data is attached to the uncorrectable data transmitted by the existing node F to the general-purpose node G. Hence, when the transmitting unit 9 transmits the poisoning data, "1" is set in the po bit of the register 13 provided in the existing node F.

Furthermore, for instance, if the uncorrectable error occurs in the general-purpose node G, the data transmitted by the general-purpose node G to the existing node H is the uncorrectable data. In this case, the uncorrectable data transmitted by the general-purpose node G does not pass through the existing node F. Accordingly, in the same way as in the case where the uncorrectable error occurs in the bus 7 connecting the existing node F and the general-purpose node G to each other, the po bit of the register 13 provided in the existing node F is in the status of the initial value "0". When the general-purpose node G transmits the uncorrectable data to the existing node H, the general-purpose node G detects the uncorrectable error.

Moreover, the present embodiment has exemplified the system including the display unit 4, however, a system having none of the display unit 4 may also be available. For example, the display unit 4 may be provided outside the system by changing the bus 17 shown in FIG. 2 to an external interface. The external interface with the Internet or Intranet can be used.

Figure 4:
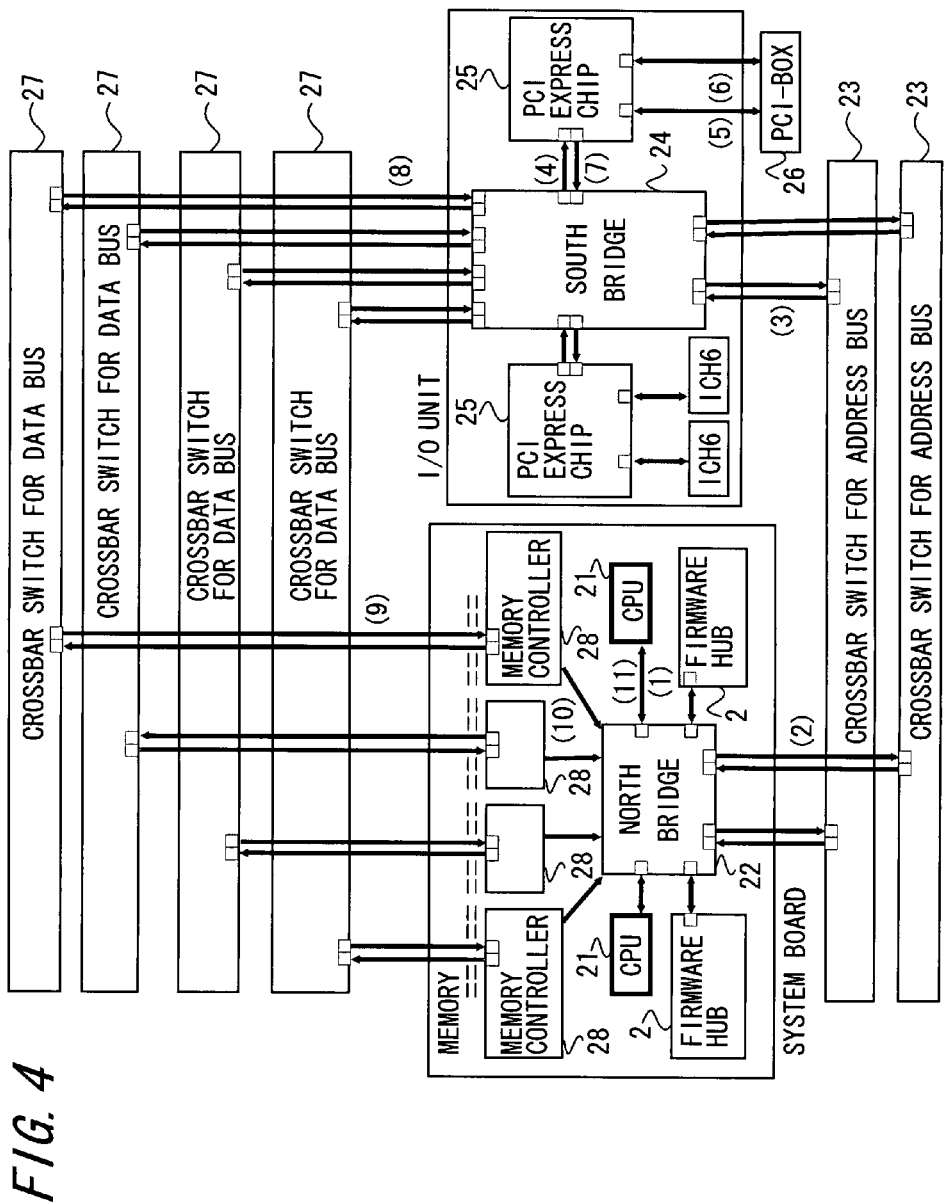
FIG. 4 is a diagram showing an example of a system configuration in the present embodiment.

FIG. 4 is a diagram showing an example of a system configuration in the present embodiment. An address flow and a data flow in the present embodiment will be explained with reference to FIG. 4.

To begin with, the address flow in the present embodiment will be explained. The CPU 21 issues a read request to a north bridge 22 (1). The north bridge 22 transmits the address information to a crossbar switch 23 for an address bus (2). The crossbar switch 23 for the address bus transmits the address information to a south bridge 24 (3). The south bridge 24 transmits the address information to a PCI Express chip 25 (4). The PCI Express chip 25 transmits the address information to a PCI-BOX 26 (5).

Next, the data flow in the present embodiment will be explained. The PCI-BOX 26 receiving the address information reads the data corresponding to the address from an unillustrated PCI device connected to the PCI-BOX 26, and transmits the readout data to the PCI Express chip 25 (6). The PCI Express chip 25 transmits the data to the south bridge 24 (7). The south bridge 24 sends the data to a crossbar switch 27 for a data bus (8). The crossbar switch 27 for the data bus transmits the data to a memory controller 28 (9). The memory controller 28 transmits the data to the north bridge 22 (10). The north bridge 22 sends the data to the CPU 21. The CPU 21 receives the read data, thereby completing the read request (11).

The CPU 21, the north bridge 22, the south bridge 24, the PCI Express chip 25, the PCI-BOX 26, the crossbar switch 27 for the data bus and the memory controller 28, which are illustrated in FIG. 4, correspond to the existing node E, the existing node F, the general-purpose node G and the existing node H shown in FIGS. 2 and 3. Further, each of the north bridge 22, the south bridge 24, the PCI Express chip 25, the crossbar switch 27 for the data bus and the memory controller 28 includes the POISON detector 12 shown in FIGS. 2 and 3. These schemes of configuration are exemplifications, and the configuration in the present embodiment is not limited to these schemes of configuration. Further, the system in the present embodiment can be actualized as an LSI substrate mounted with an LSI (Large Scale Integration).

In the present embodiment, the ECC is attached to the data stored in the PCI device. Further, each of the CPU 21, the north bridge 22, the south bridge 24, the PCI Express chip 25, the PCI-BOX 26, the crossbar switch 27 for the data bus and the memory controller 28, which are illustrated in FIG. 4, has a function of attaching the ECCs. It is therefore possible to attach the ECCs taking different formats from the ECC attached to the data stored in the PCI device.

Figure 5:
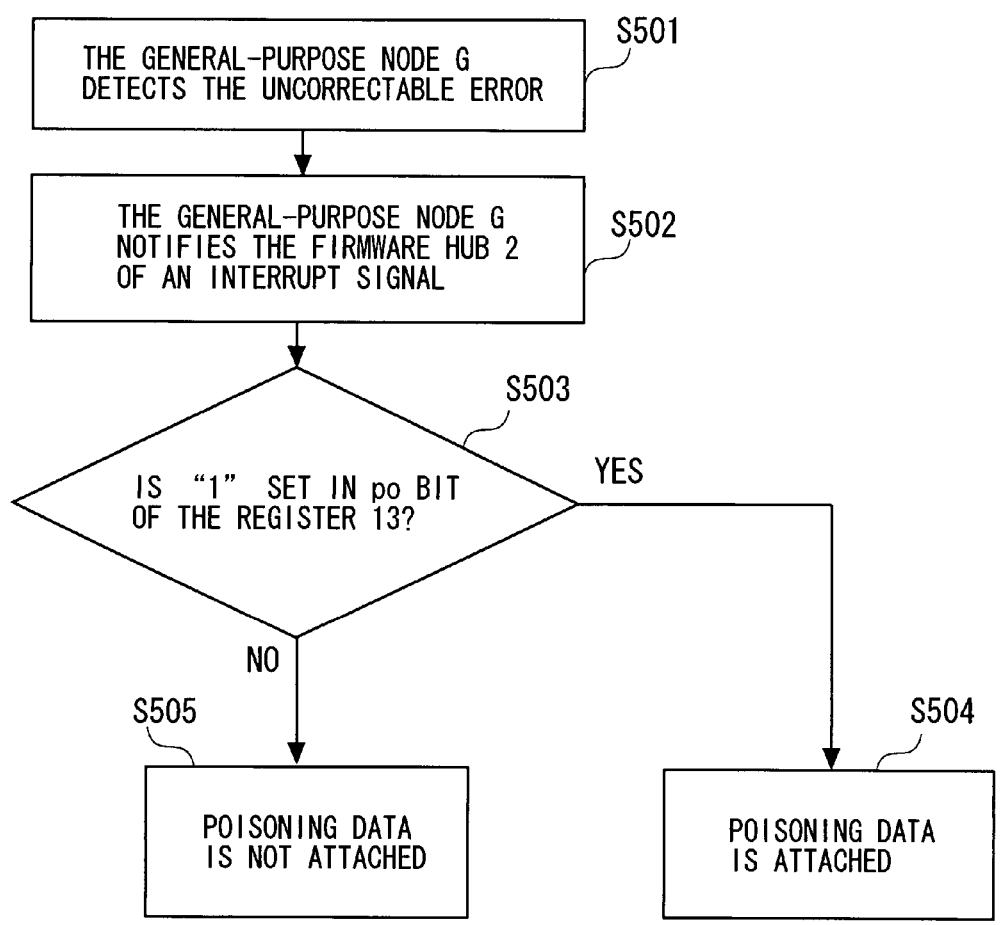
FIG. 5 is an operation flowchart of the system in the present embodiment.

FIG. 5 is an operation flowchart of the system in the present embodiment. FIG. 5 illustrates how the system operates after the general-purpose node G shown in FIG. 2 has received the uncorrectable data from the existing node F. The general-purpose node G receiving the uncorrectable data from the existing node F, on the occasion of transmitting the uncorrectable data to the existing node H, detects the uncorrectable error (S501) Next, the general-purpose node G notifies the firmware hub 2 of an interrupt signal (S502). Then, the firmware hub 2 refers to the register 13 of the existing node F and judges whether "1" is set in the po bit of the register 13 or not (S503).

When "1" is set in the po bit of the register 13 of the existing node F, the firmware hub 2 notifies the management unit 3 that "1" is set in the po bit of the register 13 of the existing node F. The management unit 3 recognizes that the poisoning data is attached to the uncorrectable data which is to be transmitted by the general-purpose node G (S504).

Thus, when the management unit 3 recognizes that the poisoning data is attached to the uncorrectable data which is to be transmitted by the general-purpose node G, it is judged that the detection of the uncorrectable error by the general-purpose node G is attributed to neither a fault in the general-purpose node G nor a fault in the bus 7 connected to the general-purpose node G. Namely, it can be judged that the general-purpose node G has transmitted the uncorrectable data attached with the poisoning data due to the occurrence of the fault in any one of the nodes or the buses within the system.

While on the other hand, if "1" is not set in the po bit of the register 13 of the existing node F (if "0" is set in the po bit of the register 13 of the existing node F), the firmware hub 2 notifies the management unit 3 that "1" is not set in the po bit of the register 13 of the existing node F. The management unit 3 recognizes that the poisoning data is not attached to the uncorrectable data which is to be transmitted by the general-purpose node G (S505).

Thus, when the management unit 3 recognizes that the poisoning data is not attached to the uncorrectable data which is to be transmitted by the general-purpose node G, it is judged that the detection of the uncorrectable error by the general-purpose node G is attributed to the fault in the general-purpose node G or the fault in the bus 7 connected to the general-purpose node G.

According to the present embodiment, when the firmware hub 2 receives the interrupt notification from the general-purpose node G, the firmware hub 2 refers to the po bit of the register 13 of the existing node F. When the firmware hub 2 recognizes that "1" is set in the Po bit of the register 13 of the existing node F, it can be judged that the uncorrectable error occurs in a place other than the general-purpose node G and the bus 7 connected to the general-purpose node G. Namely, it can be judged that the fault occurs in neither the general-purpose node G nor the bus 7 connected to the general-purpose node G.

Accordingly, even when the uncorrectable data is detected on such an occasion that the general-purpose node G transmits the uncorrectable data attached with the poisoning data, the general-purpose node G and the bus 7 connected to the general-purpose node G can be prevented from being excessively pointed out as under-suspicion components. As a result, it is possible to prevent extra exchanges of the general-purpose node G and the bus 7 connected to the general-purpose node G.

MODIFIED EXAMPLE

The embodiment has exemplified the configuration, wherein the management unit 3 controls the display unit 4, thereby disabling the display unit 4 to display the detection of the uncorrectable error by the general-purpose node G due to the general-purpose node G's transmitting the uncorrectable data attached with the poisoning data (which will hereinafter be termed "the detection of a ripple error"). All of the uncorrectable errors detected by the general-purpose node G can be also displayed on the display unit 4.

In this case, an available scheme is that the management unit 3 controls the display unit 4, thereby displaying, on the display unit 4 in a different modes, the detection of the uncorrectable error by the general-purpose node G (which will hereinafter be referred to as the detection of the error due to the fault in the general-purpose node etc) due to the passage of the uncorrectable data attached with none of the poisoning data through the general-purpose node G and also the detection of the ripple error. To be specifics, the available scheme is that the detection of the ripple error is displayed on the display unit 4, and the detection of the error due to the fault in the general-purpose node etc is displayed on the display unit 4 in the distinguishable display mode from the mode of displaying the detection of the ripple error.

The detection of the error due to the fault in the general-purpose node etc and the detection of the ripple error are displayed on the display unit 4 in the different modes, thereby making it possible to recognize the detection of the ripple error and to prevent the general-purpose node G detecting the ripple error and the bus 7 connected to the general-purpose node G from being excessively pointed out as the under-suspicion components.

Moreover, IP addresses are assigned to a personal computer, a mobile terminal, etc that are each mounted with the LSI substrate including the present system, whereby Web management can be attained. Namely, the personal computer, the mobile terminal, etc that are each mounted with the LSI substrate including the present system are connected to a server via the external interface, whereby a user can recognize the detection of the uncorrectable error on the Web. The management by the server on the Web can be actualized by installing Web management software into the server. Further, the server can be actualized by general types of personal computer, workstation, etc. In this case, the server is connected to the display unit 4, whereby the uncorrectable error detection information received by the server is decrypted by a Browser and then displayed on the display unit 4.

Moreover, the existing node E, the existing node F, the general-purpose node G and the existing node H in the present embodiment can be replaced by the network-communication-enabled personal computer, mobile terminal, etc. In this case, the bus 6, the bus 7 and the bus 8 are replaced by the network-communication-enabled signal lines, the Internet or the Intranet, whereby the system employing the network can detect the uncorrectable error.

<Computer Readable Recording Medium>

It is possible to record a program which causes a computer to implement any of the functions described above on a computer readable recording medium. By causing the computer to read in the program from the recording medium and execute it, the function thereof can be provided. The computer readable recording medium mentioned herein indicates a recording medium which stores information such as data and a program by an electric, magnetic, optical, mechanical, or chemical operation and allows the stored information to be read from the computer. Of such recording media, those detachable from the computer include, e.g., a flexible disk, a magneto-optical disk, a CD-ROM, a CD-R/W, a DVD, a DAT, an 8-mm tape, and a memory card. Of such recording media, those fixed to the computer include a hard disk and a ROM (Read Only Memory)

<Others>

The disclosures of Japanese patent application No. JP2006-223346 filed on Aug. 18, 2006 including the specification, drawings and abstract are incorporated herein by reference.

What is claimed is:

1. A control device managing a plurality of nodes transmitting and receiving data containing an error correcting code, comprising:
    an accepting unit for accepting a signal transmitted from any one of the plurality of nodes that has detected an uncorrectable error from data containing the error correcting code;
    a judging unit for judging, if the accepting unit has accepted the signal from a second node that has received data transmitted from a first node, whether or not the first node has detected the uncorrectable error from the data transmitted to the second node based on the detection record of the first node; and
    a stopping unit for stopping a process attributed to the reception of the signal from the second node if the judging unit has judged that the first node has detected the uncorrectable error from the data transmitted to the second node.

2. The control device according to claim 1, further comprising a controlling unit for controlling a display device to display information corresponding to a detection of the uncorrectable error detected by any one of the plurality of nodes,
    wherein the process attributed to the signal reception is a process of displaying the detection of the uncorrectable error detected by the second node on the display device; and
    if the judging unit has judged that the first node has detected the uncorrectable error, a display of information of the detection of the uncorrectable error by the second node is not operated.

3. A node device cooperating with a control device managing a plurality of node devices, comprising:
- a transmitting/receiving unit for transmitting and receiving data containing an error correcting code to and from another node;
- a converting unit for converting an error correcting code contained in data to be transmitted to the another node into poisoning data having a value other than a value that the error correcting code can take if an correctable error is detected from the data to be transmitted to the another node;
- a record control unit for recording a record of transmission of the poisoning data into a recording unit that is referable from the control device if the transmitting/receiving unit transmits the data containing the poisoning data to the another node; and
- a detecting unit for detecting an uncorrectable error from data transmitted to a first node,
- wherein the detecting unit, if the data received from a second node includes the poisoning data, does not detect the uncorrectable error with respect to the data transmitted to the first node.

4. A control method of a control device managing a plurality of nodes transmitting and receiving data containing an error correcting code, comprising:
- receiving a signal from a first node among the nodes that has detected an uncorrectable error in data that the first node has received;
- judging whether a second node that transmitted the data to the first node has detected the uncorrectable error in the transmitted data or not if the signal from the first node is received; and
- operating a process corresponding to the signal received from the first node if having received the signal, while not operating the process in the case if it is judged that the second node has detected the uncorrectable error.

5. The control method of a control device according to claim 4, further comprising:
- displaying information corresponding to the detection of an uncorrectable error by any one of the plurality of nodes upon receiving the signal from the node,
- wherein if it is judged that the second node has detected the uncorrectable error, a display of information that the first node has detected the uncorrectable error is not operated.

6. A non-transitory, computer readable medium recorded with a control program making a computer execute:
- receiving a signal from a first node among the nodes that has detected an uncorrectable error in data that the first node has received;
- judging whether a second node that transmitted the data to the first node has detected the uncorrectable error in the transmitted data or not if the signal from the first node is received; and
- operating a process corresponding to the signal received from the first node if the signal is received, while not operating the process in the case where it is judged that the second node has detected the uncorrectable error in the data transmitted to the first node.

7. The non-transitory, computer readable according to claim 6, wherein the process corresponding to the signal is a process for displaying information corresponding to the detection of an uncorrectable error by any node,
- the information indicating that the first node has detected the uncorrectable error is not displayed even if signal is received from the first node if it is judged that the second node has detected the uncorrectable error.

8. A control device connected to a display device, for managing a plurality of nodes transmitting and receiving data containing an error correcting code, comprising:
- a receiving unit for receiving a signal from any node indicating that the node has detected an uncorrectable error in data received from another node;
- a judging unit for judging whether the another node has detected an uncorrectable error in data transmitted to the node by referring to an error detection record of the another node, if the receiving unit has received the signal from the node; and
- a control unit for controlling, upon the receiving unit has received the signal, the display unit to display information indicating that the node has detected the uncorrectable error if the judging unit judged that the another node has not detected the uncorrectable error, and not to display the information if the judging unit judged that the another node has detected the uncorrectable error in the data transmitted to the node.

9. The control device according to claim 8, wherein the judging unit judges whether the another node has detected the uncorrectable error if the receiving unit has received the signal from a type of node that cannot detect a poisoning data contained in the received data, the poisoning data is data in which any node that has detected the uncorrectable error has generated by converting the error correcting the error correcting code contained in the data the uncorrectable error is detected into a data having a value different from the error correcting code.

* * * * *